US011588958B2

(12) United States Patent
Chen et al.

(10) Patent No.: US 11,588,958 B2
(45) Date of Patent: Feb. 21, 2023

(54) PROBE ASSEMBLY FOR PROCESS VESSELS

(71) Applicants: Chen Chen, Ontario (CA); William Cote, Ontario (CA); Paul Ream, Cranberry Township, PA (US)

(72) Inventors: Chen Chen, Ontario (CA); William Cote, Ontario (CA); Paul Ream, Cranberry Township, PA (US)

( * ) Notice: Subject to any disclaimer, the term of this patent is extended or adjusted under 35 U.S.C. 154(b) by 36 days.

(21) Appl. No.: 17/493,530

(22) Filed: Oct. 4, 2021

(65) Prior Publication Data

US 2022/0116515 A1    Apr. 14, 2022

Related U.S. Application Data

(60) Provisional application No. 63/090,416, filed on Oct. 12, 2020.

(51) Int. Cl.
*G03B 11/04* (2021.01)
*H04N 5/225* (2006.01)
*F27D 21/02* (2006.01)

(52) U.S. Cl.
CPC ........... *H04N 5/2252* (2013.01); *F27D 21/02* (2013.01); *G03B 11/045* (2013.01); *H04N 5/22521* (2018.08); *F27D 2021/026* (2013.01); *H04N 2005/2255* (2013.01)

(58) Field of Classification Search
None
See application file for complete search history.

(56) References Cited

FOREIGN PATENT DOCUMENTS

CN    108005668 A    *    5/2018
CN    209608747 U    *    11/2019

* cited by examiner

*Primary Examiner* — Shadan E Haghani
(74) *Attorney, Agent, or Firm* — Barry Choobin; Patent 360

(57) ABSTRACT

A probe assembly for a process vessel for viewing the inside of the vessel, the probe assembly includes an elongated bracket, an elongated frame, an ICPC unit, and a camera unit. The elongated bracket has a front face and a rear face, the elongated bracket having an upper portion and a lower portion, the lower portion has a first aperture. The elongated frame has a proximal end and a distal end, the distal end of the elongated frame is coupled to the upper portion of the front face of the bracket. The ICPC unit includes a housing that has a front wall, a rear wall, and side wall extended between the front wall and the rear wall, the front wall has a second aperture, the rear wall has a third aperture. The ICPC unit further includes an actuator enclosed in the housing and an elongated tube operably coupled to the actuator, the tube extends through the second aperture and the first aperture away from the rear face of the bracket, the actuator configured to reciprocate the tube between an extended position and a retracted position. The camera unit includes a camera enclosure housing a camera, wherein the actuation member is configured to reciprocate the camera unit between the engage mode and stand-by mode, in the engage mode, the lens' hood is within the tube of the ICPC unit, and in the stand-by mode, the camera unit is away from the ICPC unit towards the proximal end of the elongated frame.

19 Claims, 8 Drawing Sheets

PROBE ASSEMBLY FOR PROCESS VESSELS

CROSS-REFERENCE TO RELATED APPLICATIONS

This application claims priority to the U.S. provisional patent application Ser. No. 63/090,416, filed on Oct. 12, 2020, which is incorporated herein by reference in its entirety.

FIELD OF INVENTION

This present invention relates to process vessels, such as melting furnaces etc., and more particularly relates to the process vessels having a camera for viewing the inside of the vessel when needed.

BACKGROUND

For many years, operators of process vessels such as melting furnaces, degassers, smelters, and such equipment had no visibility of the condition of the vessel before, between, and after a process cycle other than by the human eye when a roof is removed or through portholes or other openings in the vessels such as slag holes, etc. In these cases, operators would have to get into possibly dangerous positions and quickly observe the condition in the vessel after a process stop and if possible after loading of the vessel.

Over the years, camera systems with protective cooled jackets were developed to allow operators to observe certain conditions within the vessels. In some cases, cameras were developed with retraction mechanisms that allow the cameras to be moved into position for a short time and removed using timers or after temperatures reached the maximum allowable for the camera.

Known are roof-mounted camera systems for process vessels having the cameras mounted on the roof of the vessels to view the vessel from above. These cameras by the nature of the violence of the reactions during processing could be inserted into the roof when feasible and retracted. The views from the camera while helpful do not show a view of the sidewalls of the vessel or the vertical view of the charge or heel. Also known are the camera systems having the cameras mounted above the vessel and to the side: This application is relatively new and allows the operator to look into the vessel between process cycles when the roof is removed for charging. These cameras are limited to the view from above but do provide a valuable and safe evaluation of the conditions within the vessel including if possible, the activity at the surface of the process liquids.

Also are known other methods for observing the interior of the process vessel. For example, cameras positioned outside of the slag hole can observe the flow of slag or waste and once the vessel is emptied (tapped) there is a momentary and restricted view of the inside of the furnace. Also, known are cameras mounted on robots that have as their primary purpose to perform minor repairs to the vessel refractory and taking temperature and chemical samples of the liquid process material.

However, the known camera systems for looking into the process vessels have several limitations. In specific, the known camera systems do not allow for in-situ observation and measurement of high temperature and molten material processes. A need is therefore appreciated for a camera system for process vessels that can provide a better inside view of the vessel when needed. A need is there for a system that improves the process efficiencies. A need is there for a system that can improve the overall safety of the process. Moreover, a need is there for a system that may allow equipment condition evaluations without opening the vessel. A need is there for a system that may allow looking inside molten material vessels before, after, and between melts without opening the vessel.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
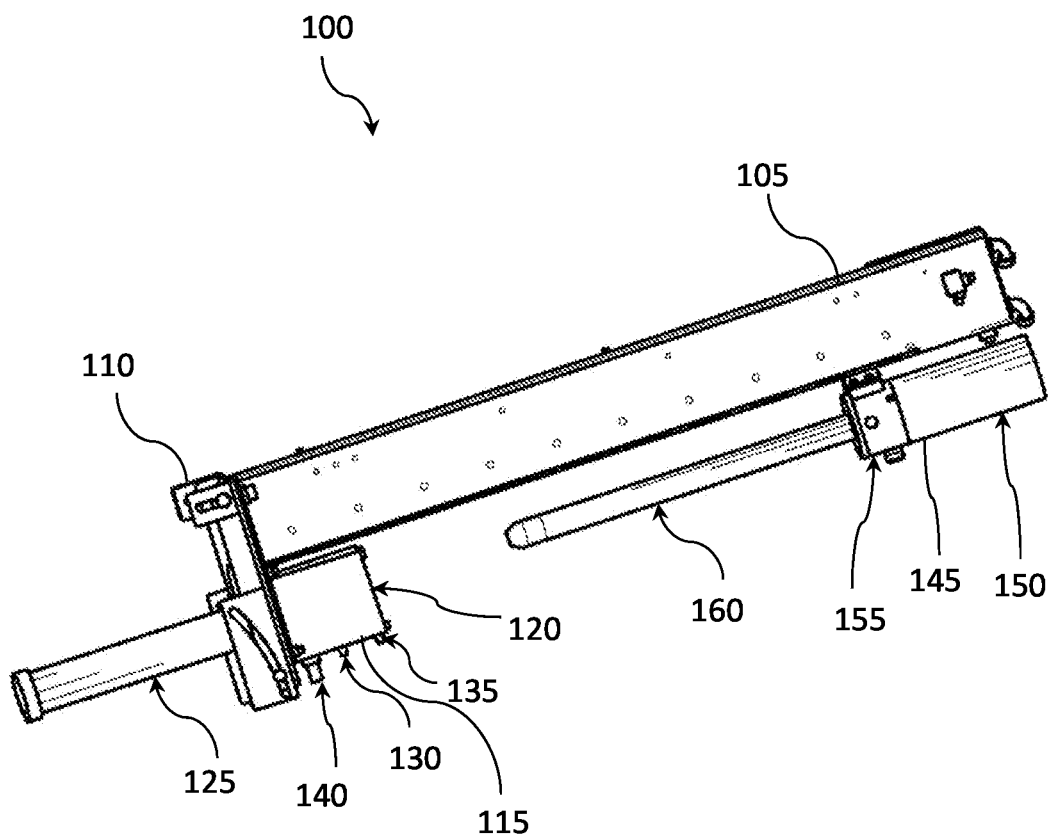
FIG. 1 is a perspective view of a probe assembly in a stand-by mode and showing an in-line Camera Port cleaning unit ("ICPC unit"), a camera unit, and a mechanical retraction frame ("frame"), according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

REFERENCE NUMERALS

100 Probe assembly
105 Frame
110 Bracket
115 ICPC unit
120 ICPC housing
125 Thermal insulation sleeve
130 Air inlet port
135 Air outlet port
140 Air purge port
145 Camera unit
150 Camera enclosure
155 Joint
160 Lens hood
165 ICPC actuator
170 ICPC tube
175 ICPC tube removable tip
177 Hardened projections
180 Third aperture in rear wall of the ICPC housing
185 Second aperture in front wall of the ICPC housing
200 Cooling plate
205 Shell of the process vessel
210 Mounting bracket
215 Process vessel
230 Air junction box
235 ICPC control unit
240 control unit
245 Customer's PLC Disclosed herein is a probe assembly that can be mounted to a sidewall of a process vessel and can provide a camera view through the sidewall vessel shell for certain slag or dross producing processes (above the process liquid level). The disclosed probe assembly provides for inspecting the sidewall of the process vessel when required before, after, and in between the process cycles. The disclosed probe assembly allows for the inspection of the sidewalls of refractory and/or water-cooled shell components allowing for predictive maintenance for better up-time and to identify water leaks (dark spots) in the water-cooled shell. This is particularly important with the roof still closed if a water leak is suspected. In the presence of water in the vessel, deadly steam explosions can occur if the scrap shifts due to vibration of the roof movement, therefore, the disclosed probe assembly is having a particular and important advantage to be able to perform an inspection inside the vessel with the roof still closed. This can dramatically enhance the safety of the process. Furthermore, the disclosed probe assembly can provide close-up views of the heel {portion of the melt/process remaining in the vessel after the melt has been tapped}.

Advantageously, the disclosed assembly can also provide a vertical view of the charged material prior to the process. Having this prospective provides the operators the opportunity to reposition the charge, if necessary, prior to the begin of the melt/process allowing for faster cycle time and better results. The disclosed probe assembly can also provide a view of the slag-dross during the process. This provides a view of the slag on the surface of the melt during operation. In many cases, the condition and level of the slag is of vital importance to the operators for quality and cost considerations.

The one major roadblock to the installation of sidewall cameras in process vessels is the presence of a thin layer of slag or dross that has adhered to the water-cooled side wall panels that are placed above the meniscus of the melt or process liquid. All current vessel camera designs with insertion and retraction require an unrestricted path for the movement of the camera lens and probe assembly. Under current camera designs, there is no way to provide this clear path for movement of the camera probe assembly, hence this valuable camera location has yet to be solved and this important need has been unfulfilled.

Referring to FIG. 1 which shows an exemplary embodiment of the disclosed probe assembly. The probe assembly includes a frame, also referred herein as the mechanical retraction frame. The frame has a proximal end and a distal end. At the distal end of the frame is a bracket for mounting the disclosed probe assembly to a sidewall of the process vessel. The elongated bracket is of an elongated configuration that has an extended portion that extends downwards relative to the frame. The extended portion of the elongated bracket has a first aperture and an ICPC unit coupled to the extended portion of the bracket. The thermal insulation sleeve encasing the ICPC tube of the ICPC unit passes through the first aperture of the bracket. The ICPC housing of the ICPC unit can be seen coupled to the bracket. Adjacent the ICPC unit is a camera unit supported by the frame. The frame can have an actuation member to which the camera port is coupled. The actuation member can reciprocate the camera unit towards and away from the ICPC unit.

The camera unit shown in FIG. 1 cam have a camera encased in a cylindrical camera housing. A joint at the end of the camera housing mounts the camera unit to the actuation member of the frame. The frame can be hollow inside with a longitudinal slot in the lower wall of the frame. An actuation member can include a head moved by the actuation member along the length of the hollow frame. The joint of the camera unit can pass through the slot and couple to the head of the actuation member of the frame. The actual member can move the head and thus the camera probe from its proximal end towards the distal end, and from its distal end towards the proximal end. Furthermore, it can be seen in FIG. 1 is an elongated lens' hood of an elongated tube configuration that extends from the camera housing towards the ICPC unit.

FIG. 1 shows the probe assembly in a stand-by mode wherein the camera unit is retracted towards the proximal end of the frame i.e., away from the ICPC unit. The Stand-by mode for this type of application is typically employed when the vessel is in full operation and there is currently not a method to protect the camera lens and probe. Additionally, this camera location is best used for safely observing the inside of the vessel before, after and in-between process cycles.

Figure 2:
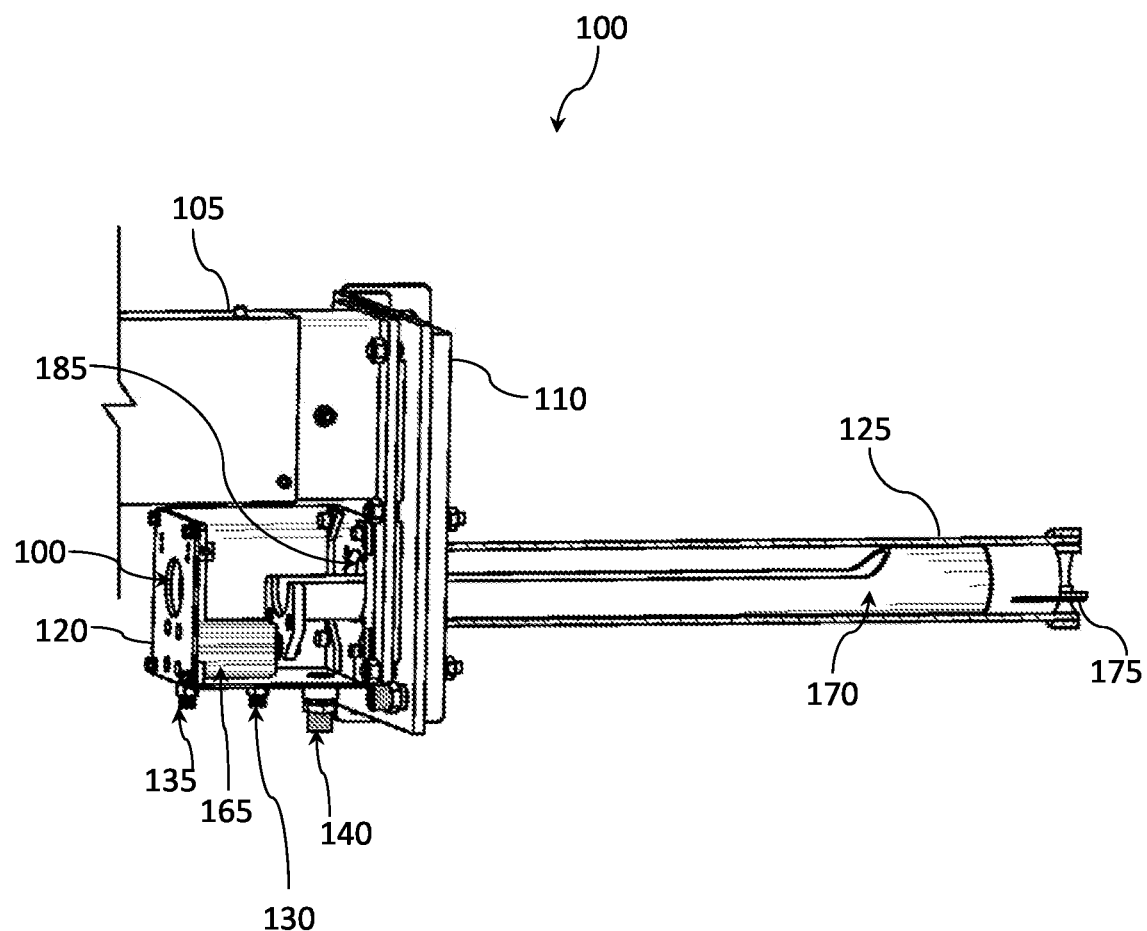
FIG. 2 is a zoomed view of the ICPC unit showing the bracket, water cooled plate, retracted ICPC tube inside a thermal insulation sleeve, ICPC housing, and the frame, according to an exemplary embodiment of the present invention.

Referring to FIG. 2 which shows a zoomed view of the ICPC unit coupled to an extended portion of the bracket. The elongated bracket can have a front side and a rear side, wherein the frame is coupled to the front side of the elongated bracket using fasteners. Below the frame is the ICPC housing of the ICPC unit. The ICPC housing includes a front wall, a rear wall, and four side walls that extend between the front wall and the rear wall defining an inner volume of the ICPC housing. The walls of the ICPC housing in FIG. 2 are shown transparently for an inside view of the housing. The front wall of the ICPC housing can also be seen coupled to the front side of the elongated bracket using the fasteners. On the other side of the elongated bracket can be seen a water-cooled plate. A thermal insulation sleeve can also be seen extending from the rear side of the bracket. The elongated bracket can have the first aperture around which the thermal insulation sleeve can be coupled. The ICPC unit can have a pneumatic ICPC actuator enclosed in the ICPC housing. In one case, the pneumatic ICPC actuator can be air driven, wherein two ports for air can be seen projecting downwards from the ICPC housing. One port can be for air-inlet while the other port for air outlet, both functioning in sync for the reciprocating stroke action of the ICPC actuator. A third port referred herein as the air purge port for purging air helps cool the ICPC actuator and keep it clean. The ICPC actuator can be operably coupled to the ICPC tube for reciprocating the ICPC tube within the thermal insulation sleeve. The ICPC actuator can have a predefined stroke length i.e., the distance the ICPC tube moves in one direction. It is to be understood that the stroke length of the actuator may depend upon the installation and furnace design. The actuator's stroke length can be customized according to each installation. For example, the stroke length can be in a range of 2-7 inches. The stroke length can be further increased as and when needed. Also, the actuator can be positioned either inside or outside the housing. For example, the larger stroke length may require the actuator to be installed outside the housing. Thus, all stroke lengths and actuator positions are within the scope of the present invention. Air cylinders can also be provided either enclosed in the housing or attached to rear of the housing.

The ICPC housing includes two apertures i.e., the second aperture in the front wall and the third aperture in the rear wall of the ICPC housing. The ICPC tube extends from the ICPC housing through the second aperture in the front wall of the ICPC housing and the first aperture of the elongated bracket into the thermal insulation sleeve. The first aperture of the bracket, the second aperture in the front wall of the ICPC housing, and the third aperture of the ICPC housing are configured such as the lens hood travels through the three apertures into the ICPC tube.

Figure 3:
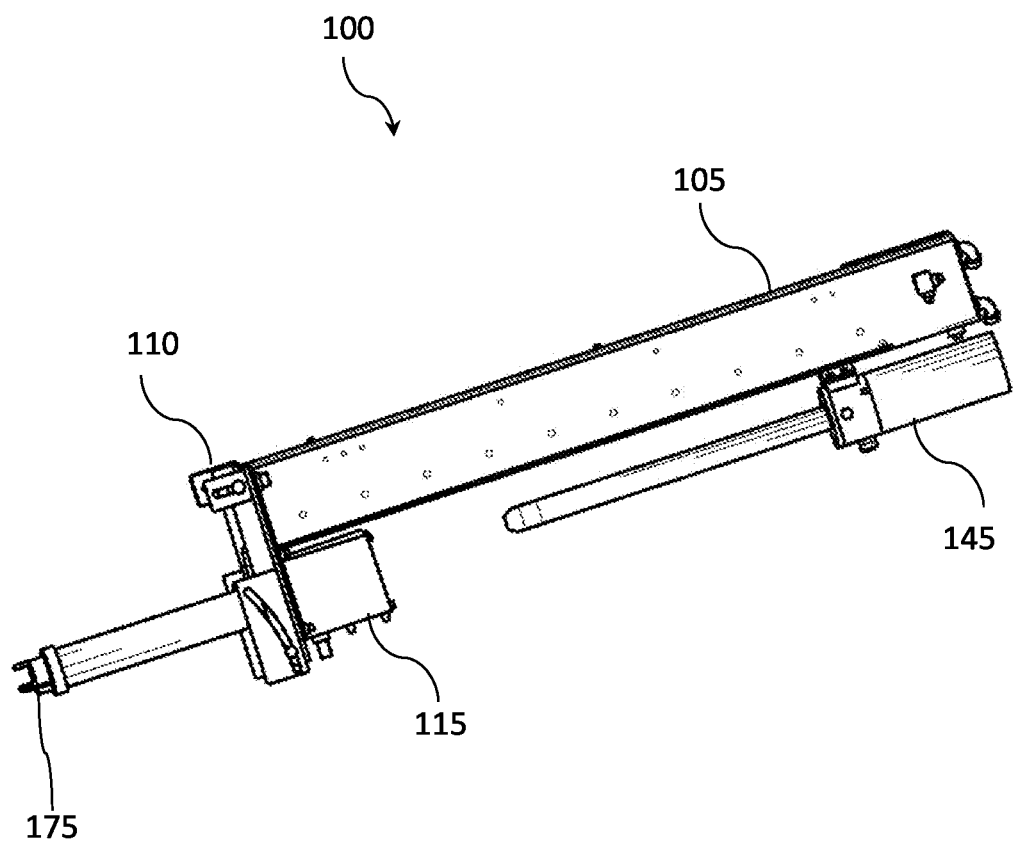
FIG. 3 shows the probe assembly of FIG. 1 with the ICPC unit and the Camera unit in a cleaning mode, wherein slag/debris is removed out of the camera's way prior to insertion of the camera, according to an exemplary embodiment of the present invention.
Figure 4:
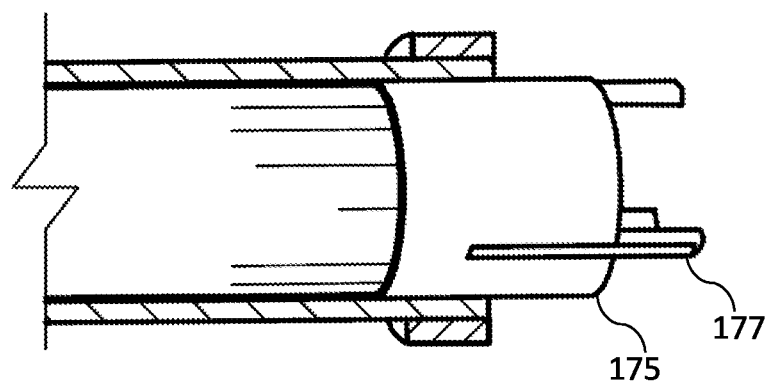
FIG. 4 is a zoomed view of ICPC tube of FIG. 2 but in the extended configuration, according to an exemplary embodiment of the present invention.

Referring to FIG. 3 which shows the probe assembly in the cleaning mode. In the cleaning mode, any process debris that has been built-up on the outer part of the thermal insulation sleeve or has entered through the opening of the thermal insulation sleeve during operation can be removed by cycling of the ICPC tube several times. The ICPC unit can function to remove any friable dross or slag deposited on or near to the tip of the thermal insulation sleeve. The ICPC actuator can reciprocate the ICPC tube in and out into the friable dross or slag impacting the inner surface of the friable material. The end of the ICPC tube can include a removable tip as shown in FIG. 4. The removable tip of the ICPC tube includes hardened projections that pierce the deposited slag making the room for the lens hood. FIG. 4 shows the ICPC tube extended outwards from the thermal sleeve tube for piercing the While, for the purpose of illustration herein, the tip is shown to have hardened projections, it should be obvious to those reading this disclosure that the shape and size of the removable tip and the projections can be modified based on the process i.e., type of physical slag and/or dross. deposits. The dislodging of the deposits by the ICPC unit can be automated, wherein the control unit of the probe assembly on receiving a command for activating the camera unit, can call the ICPC unit to initiates four quick, typical in-out strokes, to clean the path for the lens hood. In addition to the automatic operation described above, ICPC unit can also be manually operated, whereby the operator can press a button to manually activate the ICPC cleaning sequence. It can be used for testing and troubleshooting the probe assembly.

Figure 5:
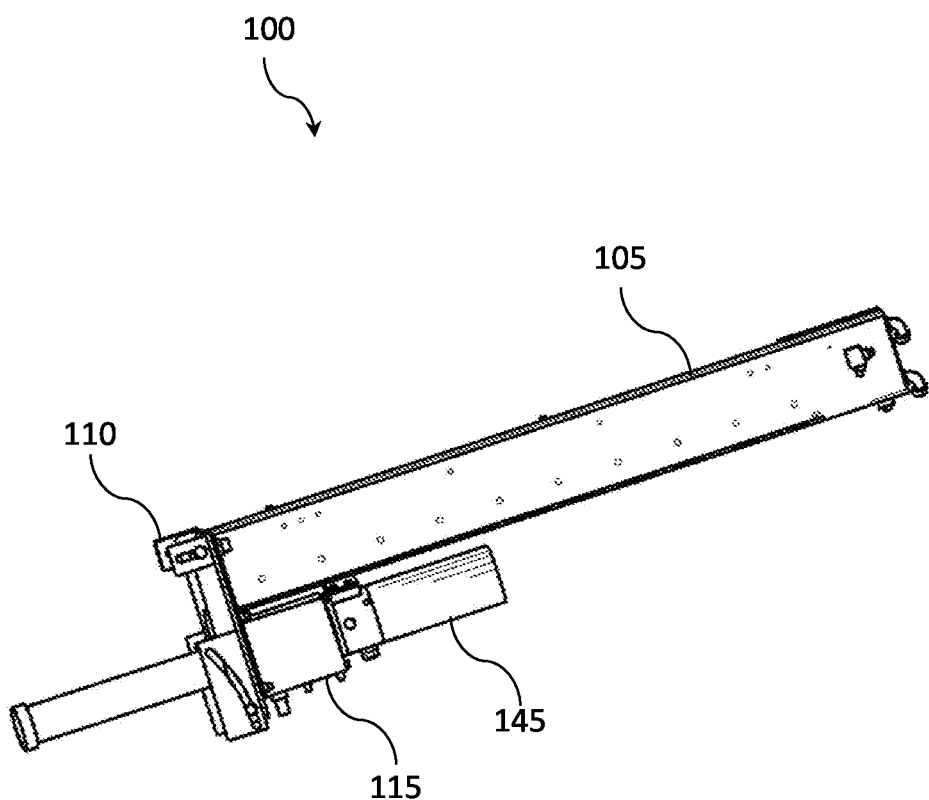
FIG. 5 shows the probe assembly of FIG. 1 with the camera unit in active mode, according to an exemplary embodiment of the present invention.

Referring to FIG. 5 which shows the camera unit in active mode. Once, the path for the lens' hood is cleaned, and the ICPC tube is retracted, the actuation member of the frame can move the camera unit towards the ICPC unit, wherein the lens hood enters the ICPC housing through the second aperture of the rear wall and travels within the ICPC tube up to the tip of the thermal insulation sleeve. The camera unit once engaged can stream the inside view of the process vessel.

In one embodiment, the ICPC unit can fit onto existing and future designs of the retractable furnace camera systems. The ICPC unit can be attached to the disclosed frame of the probe assembly. The thermal insulation sleeve can typically be a part of the camera system that allows for a path for the camera probe through the vessel shell and any insulation or internal structure. The same thermal insulation sleeve can be used in the ICPC unit. The lengths of the ICPC tube, the thermal insulation tube, and the lens hood depend upon the process vessel and installation conditions and can be customized for each installation. The ICPC tube can be made of steel or similar strong material. The ICPC housing can be made of a metallic sealed box that may have ports connected to a double acting air cylinder. The ICPC housing can further include a spring-loaded shutter to protect the camera lens when the camera unit is not engaged.

Figure 6:
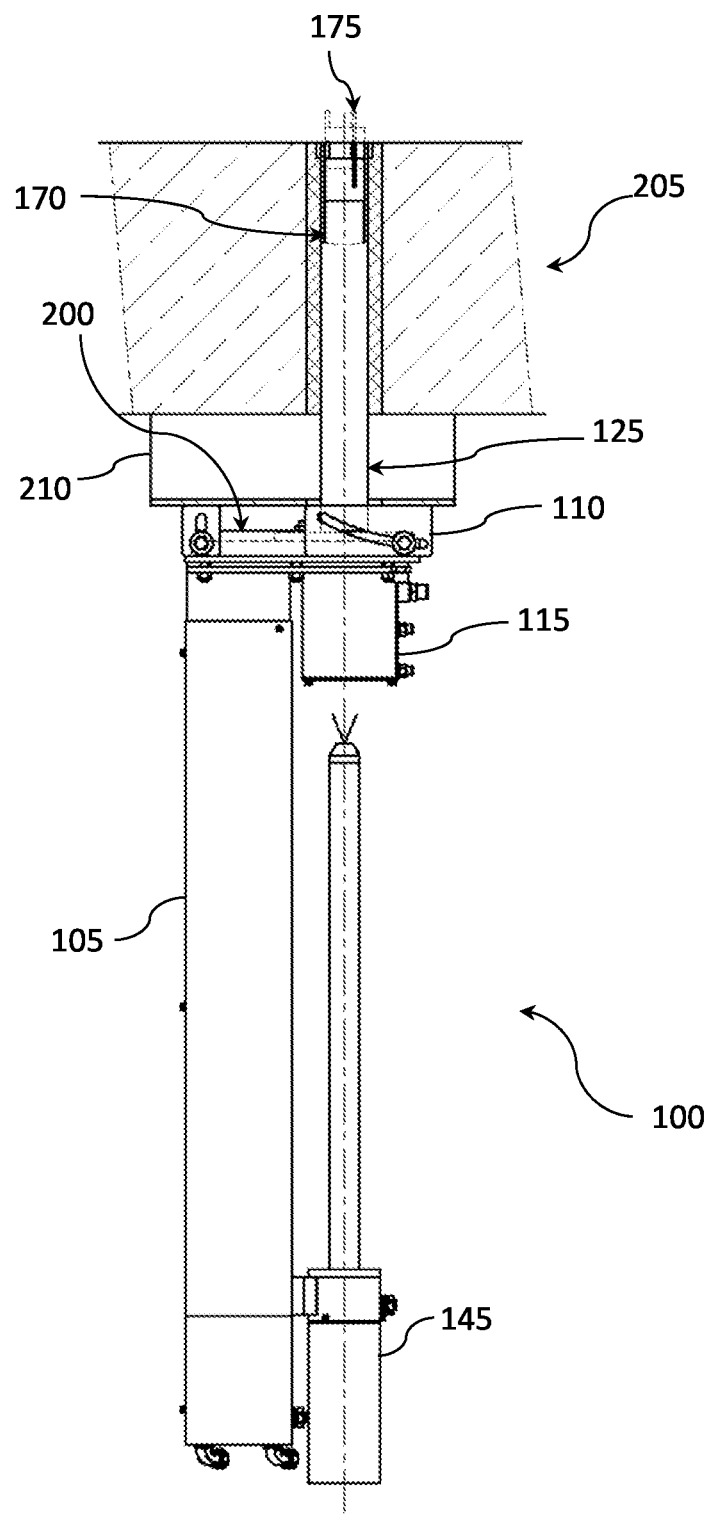
FIG. 6 shows the probe assembly installed in a side wall of the process vessel, according to an exemplary embodiment of the present invention.
Figure 7:
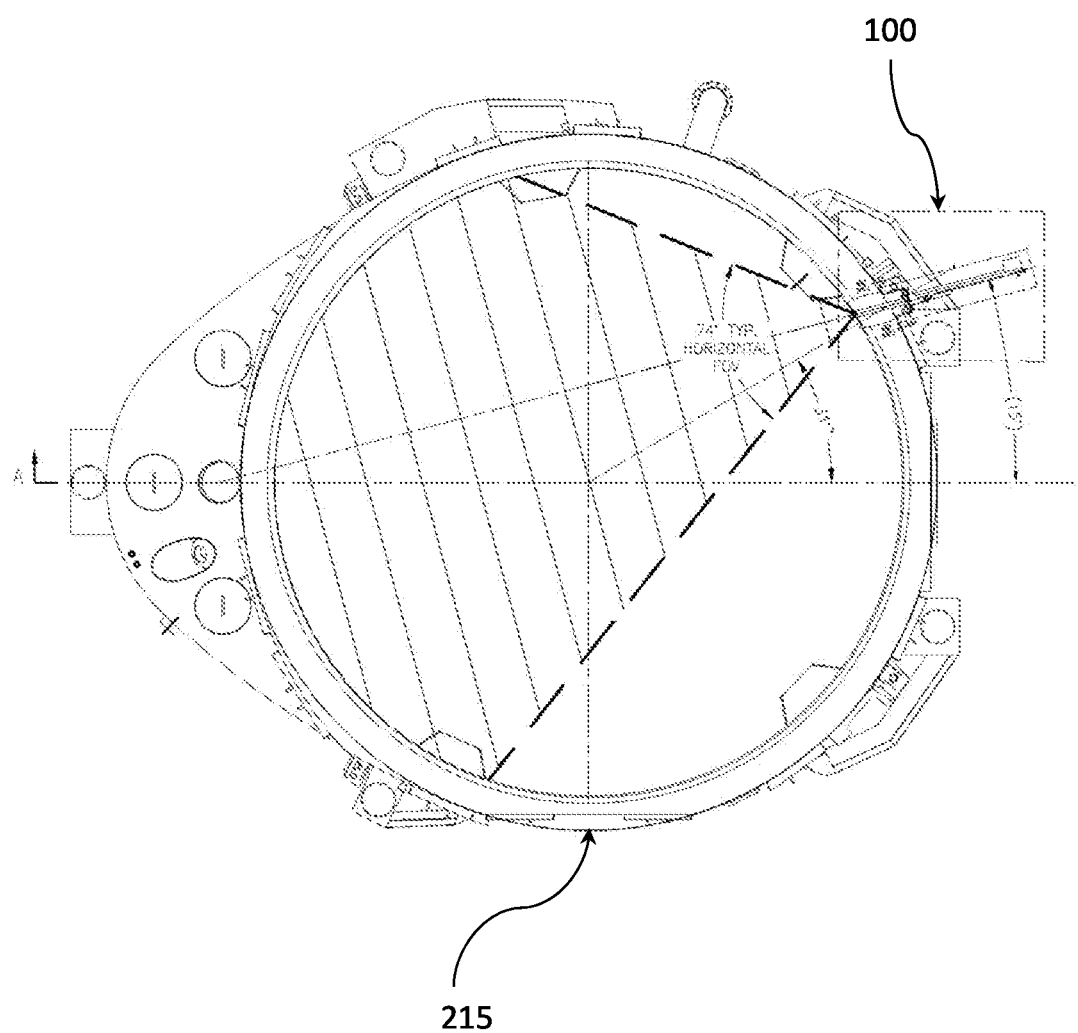
FIG. 7 in a top view of inside the process vessel showing the field of view (FOV) of the camera unit of the probe assembly, according to an exemplary embodiment of the present invention.

Referring to FIG. 6, which provides an elevation outline view of the probe assembly as installed into a process vessel in a sidewall. The thermal insulation sleeve can be inserted in a hole made in the wall/shell of the vessel. Any gap between the sleeve and hole can be filled with refractory cement or refractory cotton. A mounting bracket can be weld to the wall of the vessel and the elongated bracket of the disclosed probe assembly can be mounted to the above bracket through fasteners. In between the two brackets can be the water-cooled plate and a vibration dampening pad. The installation mounting brackets, and the cooling plate can be adjusted such that the tip of the thermal insulation sleeve is roughly in line with the inside wall of the vessel. Depending on the vessel geometry an additional mounting plate may be required. FIG. 7 shows the ICPC tube extended outwards wherein the tip of the ICPC tube can be seen inside the vessel.

In the standby mode, the camera unit remains far away from the vessel and the ICPC tube can also be retracted within the thermal insulation sleeve. For cleaning, the ICPC actuator reciprocates the ICPC tube in and out of the deposited slag cleaning the path for the lens' hood of the camera unit. Once, the deposited material is removed, the camera unit can be moved to engage with the ICPC unit, wherein the lens' hood travels through the ICPC tube up to the tip of the thermal insulation sleeve. Once there, the camera unit can start streaming the video feed of the inside vessel. FIG. 7 is a top view of the process vessel showing the field of view of the camera unit i.e., the area of the vessel covered by the camera. While installation, the lens hood can be adjusted for the desired field of view.

Figure 8:
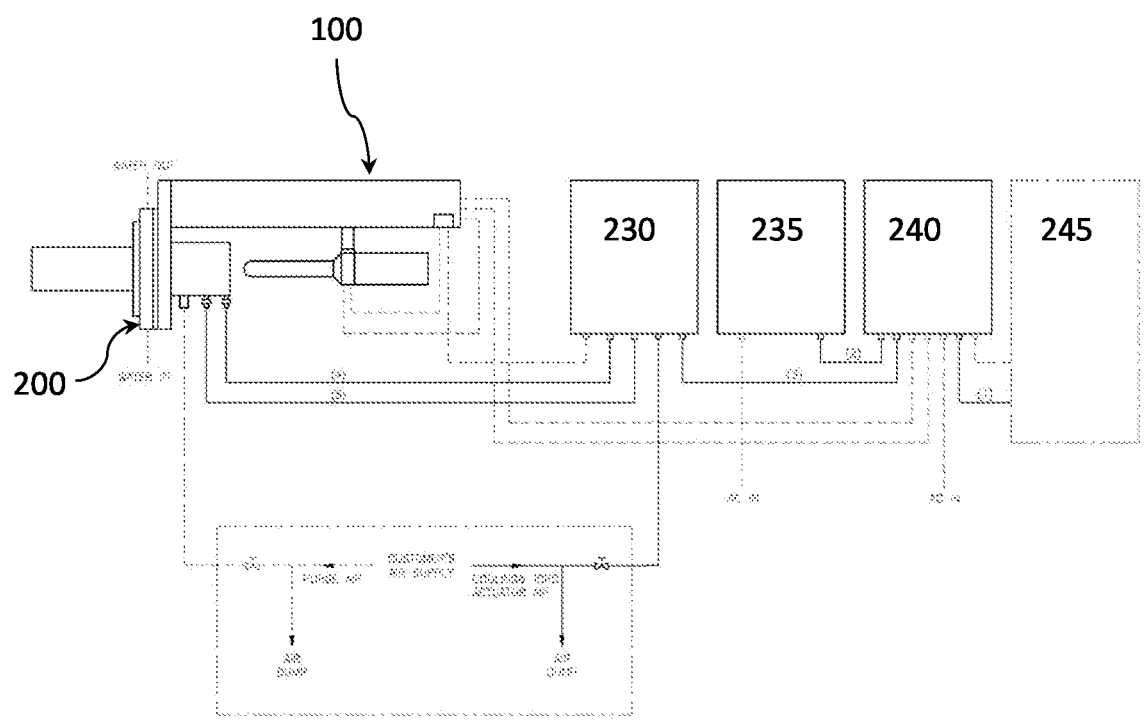
FIG. 8 is a schematic diagram showing the electronic and pneumatics configuration of the probe assembly, according to an exemplary embodiment of the present invention.

Referring to FIG. 8 which is a schematic diagram showing the functioning of the disclosed probe assembly. The two ports from the ICPC housing be seen connected to an air junction box through two steel braided hoses. The control unit can be electrically connected to different components of the disclosed probe assembly. FIG. 8 shows the control unit connected to the ICPC control unit, air junction box, and camera unit, and customer's PLC. To operate the disclosed probe assembly, the customer's PLC issues a camera extend signal to the camera unit controller. The camera unit controller upon receiving the camera extend signal can initiates several cycles which are programmable (out and in) of the ICPC unit through the air junction box and the ICPC control unit. Thereafter, the camera unit controller passes on the camera extend signal to the standard camera controller. Once the camera's work is completed, the customer can issue a camera retract signal and the camera and probe are retracted or slid back to the stand-by position. THE ICPC unit can be operated manually independent of the camera unit. A manual ICPC button inside of the ICPC control unit can be provided which enables an operator or maintenance personnel/staff to manually initiate the ICPC full operation cycles.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A probe assembly for a process vessel, the probe assembly comprising:
   an elongated bracket that has a front face and a rear face, the elongated bracket has an upper portion and a lower portion, the lower portion having a first aperture;
   an elongated frame having a proximal end and a distal end, the distal end of the elongated frame coupled to the upper portion of the front face of the bracket;
   an ICPC unit comprising:
      a housing has a front wall, a rear wall, and a side wall extended between the front wall and the rear wall, the front wall has a second aperture, the rear wall has a third aperture,
      an actuator,
      an elongated tube operably coupled to the actuator, the elongated tube extends through the second aperture and the first aperture away from the rear face of the bracket, the actuator configured to reciprocate the elongated tube between an extended position and a retracted position; and
   a camera unit comprising:
      a camera enclosure housing a camera,
      a joint mounting the camera enclosure to an actuation member, the actuation member supported by the elongated frame and configured to reciprocate the camera unit toward and away from the ICPC unit,
      a lens hood encasing lens extends from the camera enclosure, the lens hood of an elongated tubular configuration, wherein the lens hood is dimensioned to slidably inserted through the third aperture of the housing into the elongated tube of the ICPC unit,
   wherein the actuation member is configured to reciprocate the camera unit between an engage mode and a stand-by mode, the lens hood is within the elongated tube of the ICPC unit in the engage mode, and the camera unit is away from the ICPC unit towards the proximal end of the elongated frame in the stand-by mode.

2. The probe assembly according to claim 1, wherein the probe assembly further comprises a sleeve of a predetermined length, the elongated tube of the ICPC unit slidably extended within the sleeve.

3. The probe assembly according to claim 2, wherein the sleeve is coupled to the rear face of the elongated bracket around the first aperture.

4. The probe assembly according to claim 2, wherein a length of the elongated tube of the ICPC unit corresponds to the predetermined length of the sleeve, wherein the elongated tube in the extended position has a part of its length protrude from the sleeve, the elongated tube in the retracted position is within the sleeve.

5. The probe assembly according to claim 4, wherein the elongated tube is protruded about 2-7 inches.

6. The probe assembly according to claim 1, wherein the actuator has a stroke length proportional to a travel between the extended position and the retracted position of the elongated tube.

7. The probe assembly according to claim 4, wherein a length of the lens hood corresponds to the length of the sleeve, a tip of the lens hood in the engage mode is in plane of the tip of the tube.

8. The probe assembly according to claim 1, wherein the probe assembly comprises two or more actuators operably coupled to the elongated tube.

9. The probe assembly according to claim 1, wherein the actuator is an air driven actuator, the housing of the ICPC unit further comprises a drive air inlet port, a drive air outlet port, and a purge port, the purge port configured to receive purging air for cooling and cleaning the actuator.

10. The probe assembly according to claim 1, wherein the housing of the ICPC unit can further include a spring-loaded shutter configured to protect the lens hood.

11. The probe assembly according to claim 1, wherein the actuator is enclosed in an actuator housing with air cylinders either within the actuator housing or attached to a rear of the actuator housing.

12. A method for viewing inside a process vessel, the method comprising the steps of:
   providing a probe assembly comprising:
      an elongated bracket has a front face and a rear face, the elongated bracket has an upper portion and a lower portion, the lower portion has a first aperture,
      an elongated frame has a proximal end and a distal end, the distal end of the elongated frame coupled to the upper portion of the front face of the bracket,
      an ICPC unit comprising:
         a housing has a front wall, a rear wall, and side wall extended between the front wall and the rear wall, the front wall has a second aperture, the rear wall has a third aperture,
         an actuator,
         an elongated tube operably coupled to the actuator, the elongated tube extends through the second aperture and the first aperture away from the rear face of the bracket, the actuator configured to reciprocate the elongated tube between an extended position and a retracted position, and a camera unit comprising:
   a camera enclosure housing a camera,
   a joint mounting the camera enclosure to an actuation member, the actuation member supported by the elongated frame and configured to reciprocate the camera unit toward and away from the ICPC unit,
   a lens hood encasing lens extends from the camera enclosure, the lens hood of an elongated tubular configuration, wherein the lens hood is dimensioned to slidably inserted through the third aperture of the housing into the elongated tube of the ICPC unit,
   wherein the actuation member is configured to reciprocate the camera unit between an engage mode and a stand-by mode, the lens hood is within the elongated tube of the ICPC unit in the engage mode, and the camera unit is away from the ICPC unit towards the proximal end of the elongated frame in the stand-by mode;

triggering the actuator to reciprocate the elongated tube between the extended position and the retracted position for cleaning a path for the lens hood;

upon cleaning of the path, triggering the actuation member of the camera unit to move the camera unit to the engage mode; and activating the camera unit in the engaged mode to stream an inside view of the process vessel.

13. The method according to claim 12, wherein the probe assembly further comprises a sleeve encasing the path of the lens hood, the sleeve is coupled to the rear face of the elongated bracket around the first aperture, the sleeve of a predetermined length.

14. The method according to claim 13, wherein a length of the elongated tube of the ICPC unit corresponds to the predetermined length of the sleeve, wherein the elongated tube in the extended position is has a part of its length protrude from the sleeve, the elongated tube in the retracted position is within the sleeve.

15. The method according to claim 12, wherein the probe assembly comprises two or more actuators operably coupled to the elongated tube.

16. The method according to claim 12, wherein the actuator is an air driven actuator, the housing of the ICPC unit further comprises a drive air inlet port, a drive air outlet port, and a purge port, the purge port configured to receive purge air for cleaning and cooling the actuator.

17. The method according to claim 12, wherein the housing of the ICPC unit can further include a spring-loaded shutter configured to protect the lens hood.

18. A process vessel comprising a probe assembly installed in a side wall of the process vessel, the probe assembly configured to stream an inside view of the process vessel before, during, or after a process, the probe assembly comprising:
   an elongated bracket has a front face and a rear face, the elongated bracket has an upper portion and a lower portion, the lower portion has a first aperture;
   an elongated frame has a proximal end and a distal end, the distal end of the elongated frame coupled to the upper portion of the front face of the bracket;
   an ICPC unit comprising:
      a housing has a front wall, a rear wall, and side wall extended between the front wall and the rear wall, the front wall has a second aperture, the rear wall has a third aperture,
      an actuator,
      an elongated tube operably coupled to the actuator, the elongated tube extends through the second aperture and the first aperture away from the rear face of the bracket, the actuator configured to reciprocate the elongated tube between an extended position and a retracted position; and
   a camera unit comprising:
      a camera enclosure housing a camera,
      a joint mounting the camera enclosure to an actuation member, the actuation member supported by the elongated frame and configured to reciprocate the camera unit toward and away from the ICPC unit,
      a lens hood encasing lens extends from the camera enclosure, the lens hood of an elongated tubular configuration, wherein the lens hood is dimensioned to slidably inserted through the third aperture of the housing into the elongated tube of the ICPC unit,
      wherein the actuation member is configured to reciprocate the camera unit between an engage mode and a stand-by mode, the lens hood is within the elongated tube of the ICPC unit in the engage mode, and the camera unit is away from the ICPC unit towards the proximal end of the elongated frame in the stand-by mode.

19. The process vessel according to claim 18, wherein the probe assembly further comprises a sleeve of a predetermined length, the elongated tube of the ICPC unit slidably extended within the sleeve, the sleeve configured to fit into a hole in the side wall of the process vessel.

* * * * *